United States Patent
Boileau et al.

(10) Patent No.: US 12,392,305 B2
(45) Date of Patent: Aug. 19, 2025

(54) AIRCRAFT PROPULSION UNIT

(71) Applicants: Safran Nacelles, Gonfreville l'Orcher (FR); SAFRAN AIRCRAFT ENGINES, Paris (FR)

(72) Inventors: Patrick Boileau, Moissy Cramayel (FR); Pierre Caruel, Moissy Cramayel (FR); Gina Ferrier, Moissy Cramayel (FR); Quentin Garnaud, Moissy Cramayel (FR); Guillaume Glemarec, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/536,480

(22) Filed: Nov. 29, 2021

(65) Prior Publication Data

US 2022/0082064 A1    Mar. 17, 2022

Related U.S. Application Data

(63) Continuation of application No. PCT/EP2020/064763, filed on May 27, 2020.

(30) Foreign Application Priority Data

May 28, 2019 (FR) ..................... 19/05675

(51) Int. Cl.
 *F02K 1/76* (2006.01)
 *F02K 1/72* (2006.01)
(52) U.S. Cl.
 CPC ............... *F02K 1/763* (2013.01); *F02K 1/72* (2013.01)

(58) Field of Classification Search
 CPC ................................. F02K 1/72; F02K 1/763
 See application file for complete search history.

(56) References Cited

U.S. PATENT DOCUMENTS 2,950,595 A  *  8/1960  Laucher .................. F02K 1/625
                                              239/265.31
3,036,431 A  *  5/1962  Vdolek .................... F02K 1/625
                                                60/39.23
(Continued)

FOREIGN PATENT DOCUMENTS

EP    2466101    6/2012
FR    3004700    10/2014
(Continued)

OTHER PUBLICATIONS

International Search Report for International Application PCT/EP2020/064763, mailed Jul. 24, 2020.

*Primary Examiner* — Ted Kim
(74) *Attorney, Agent, or Firm* — Burris Law, PLLC (57) ABSTRACT

An aircraft propulsion unit including a nacelle and a turbojet engine. The aircraft propulsion unit includes an external envelope, at least one fan casing, at least one actuator, and at least one support structure. The external envelope includes fan cowls. The fan casing cooperates with the fan cowls to define an interior space configured to house a thrust reverser configured to be displaced between a first position and a second position. The actuator configured to move the thrust reverser between the first position and the second position The support structure connects the fan cowls and the fan. The support structure includes at least one aperture configured to allow passage of part of the actuator.

13 Claims, 7 Drawing Sheets

(56) References Cited

U.S. PATENT DOCUMENTS

| | | | | |
|---|---|---|---|---|
| 3,599,432 A | * | 8/1971 | Ellis | F02K 1/645 |
| | | | | 60/226.2 |
| 4,005,822 A | * | 2/1977 | Timms | F02K 1/72 |
| | | | | 60/226.2 |
| 5,039,171 A | * | 8/1991 | Lore | F02K 1/70 |
| | | | | 60/230 |
| 5,054,285 A | | 10/1991 | Geidel et al. | |
| 5,239,822 A | * | 8/1993 | Buchacher | F02C 7/20 |
| | | | | 60/226.2 |
| 5,309,711 A | * | 5/1994 | Matthias | F02K 1/72 |
| | | | | 60/226.2 |
| 2009/0260344 A1 | * | 10/2009 | Hoyland | F02K 1/70 |
| | | | | 60/226.2 |
| 2010/0212286 A1 | * | 8/2010 | West | F02K 1/763 |
| | | | | 60/226.2 |
| 2013/0284822 A1 | * | 10/2013 | Howarth | F02K 1/70 |
| | | | | 239/11 |
| 2016/0363097 A1 | * | 12/2016 | Foutch | F02C 7/24 |
| 2017/0167440 A1 | * | 6/2017 | Aten | F02K 1/763 |
| 2017/0260928 A1 | | 9/2017 | Crawford | |
| 2018/0230940 A1 | * | 8/2018 | Torjesen | F02K 1/72 |

FOREIGN PATENT DOCUMENTS

| | | |
|---|---|---|
| WO | 2015101758 | 7/2015 |
| WO | 2017134402 | 8/2017 |

\* cited by examiner

AIRCRAFT PROPULSION UNIT

CROSS-REFERENCE TO RELATED APPLICATIONS

This application is a continuation of International Application No. PCT/EP2020/064763, filed on May 27, 2020, which claims priority to and the benefit of FR 19/05675 filed on May 28, 2019. The disclosures of the above applications are incorporated herein by reference.

FIELD

The present disclosure relates to an aircraft propulsion unit.

BACKGROUND

The statements in this section merely provide background information related to the present disclosure and may not constitute prior art.

An aircraft is moved by one or more turbojet engines each housed in at least one nacelle. The nacelle generally has a tubular structure comprising an air inlet section upstream of the turbojet engine, a median section configured to surround a fan of the turbojet engine, and a downstream section housing the thrust reversal means. The downstream section of the nacelle surrounds the gas generator of the turbojet engine which is terminated by an ejection nozzle located downstream of the turbojet engine. The air inlet section of the nacelle comprises in particular a front lip of generally annular shape which intercepts the inlet air flow of the nacelle which is directed towards a fan. The extending of the front lip of the nacelle is particularly sought after for aerodynamic reasons, in order to extend the laminar air flow zone downstream. But its extending is not without repercussions on the design of the rest of the nacelle. In particular, the nacelle must have mechanical rigidity performance so as to reduce its deformations during stresses in operation.

In patent FR3004700, a nacelle for an aircraft turbojet engine with an extended front lip is described. This nacelle for an aircraft turbojet engine includes a substantially cylindrical internal envelope, a substantially cylindrical external envelope, a downstream partition and an upstream partition secured to the internal envelope, and a front lip arranged in front of the upstream partition. The internal envelope being of the type including an upstream part includes an acoustic shroud connected by an attachment flange to a downstream part including a fan casing. The front lip is extended and disposed over the upstream partition by having a downstream edge between the upstream and downstream partitions to come to be secured to a corresponding edge of the external envelope so as to preserve maintenance access to the attachment flange.

The downstream partition connects the fan cowls present on the external envelope to the fan casing present on the internal envelope. This downstream partition is disposed at the limit of the retracted zone of the thrust reverser.

The use of such a partition, however, has a drawback which is that of requiring a useful volume or bulk for its integration between the internal and external envelopes which involves increasing the longitudinal dimension of the nacelle, all the more so when the nacelle is of the type including a sliding cascades thrust reverser, thus inhibiting the possibility of shortening the nacelle.

SUMMARY

This section provides a general summary of the disclosure and is not a comprehensive disclosure of its full scope or all of its features.

The present disclosure provides an aircraft propulsion unit comprising a nacelle and a turbojet engine. The nacelle comprises an external envelope including fan cowls. The turbojet engine including at least one fan casing. The fan cowls and at least one fan casing being connected by at least one support structure and configured to define an interior space for housing grids of a sliding cascades thrust reverser. The thrust reverser being configured to be displaced between a first position, corresponding to a position in which the reverser is retracted, not producing thrust reversal and a second position, corresponding to a position in which the reverser is deployed, allowing thrust reversal, by at least one actuator. The propulsion unit being advantageous in that the support structure comprises at least one aperture configured to allow passage of part or all of the actuator. The advantage of this characteristic is that the support structure integrates part of the volume of the thrust reverser. The thrust reverser is therefore disposed further upstream of the propulsion unit and the propulsion unit can therefore be shortened.

In one form, part of the actuator passes through the corresponding aperture without being in contact with the support structure. The fact that part of the actuator passes through the corresponding aperture without being in contact with the support structure inhibits the latter from taking over the load from the actuator. The function of the support structure is therefore dedicated to supporting the fan cowls.

In another form, the support structure is configured to be fixed to the fan casing at the level of a flange, called a flange for a support structure. The support structure having a profile configured to allow it to be fixed on a selected zone of the fan cowls in order to provide mechanical strength over time. This profile makes it possible to adapt the configuration of the support structure to fix it to the fan cowls in the desired zone while taking into account the volume of the thrust reverser.

In yet another form, the profile of the support structure comprises at least one inclination. The inclination allowing an offset along a longitudinal axis of the propulsion unit between a first portion and a second radial portion of the support structure. In particular, the support structure has a substantially S-shape, a conical shape or a bevel shape, along a longitudinal axis of the propulsion unit.

In one form, the support structure comprises at least one part disposed longitudinally at the level of the fan casing. Thus, the support structure makes it possible, where appropriate, to constitute an additional interface for the non-restrictive fan cowls in the engine environment.

In another form, the support structure is configured to connect the fan cowls and the fan casing around the circumference of the fan casing. The support structure being continuous over 360°. This feature allows the support structure to support the fan cowls around the perimeter of the fan casing, providing an effective support.

In yet another form, the support structure is circumferentially discontinuous. This discontinuous configuration of the support structure makes it possible to reduce its weight and therefore to lighten the weight of the propulsion unit.

In one form, the actuator is secured to the support structure. This solidarity between the support structure and the actuator can be achieved by means of a universal joint. This allows the support structure to take up part of the load from the actuator. Thus, the support structure participates in the recovery of the stress path undergone by the actuator.

In another form, the support structure includes an additional wall. This additional wall is configured to strengthen the support of the fan cowls.

In yet another form, the propulsion unit comprises at least one first fan casing and one second fan casing. The second fan casing being disposed downstream of the first fan casing.

In one form, the actuator comprises at least one fitting configured to be fixed to the second fan casing at the level of at least one flange, called flange for actuator. The fixing of the fitting on the actuator flange provides that at least part of the load of the actuator is taken on the second fan casing.

In another form, the actuator is a jack.

In yet another form, the support structure comprises two parts, a first part being fixed to the fan cowls and a second part being fixed to at least one fan casing. The first and second parts being interconnected by a lattice structure. The lattice structure makes it possible to form apertures configured to receive each actuator of the thrust reverser.

In one form, the support structure is fixed to the flange for the support structure by means of a complementary part. The complementary part allows the support structure to be offset without impacting the integrity of the engine.

In another form, the support structure is formed integrally with the fan casing.

In yet another form, the support structure is removably attached to the fan cowls. This removable fixing of the support structure on the fan cowls provides a transfer of force between the fan cowls and at least one fan casing.

In one form, the support structure comprises at least one orifice. This provides ventilation inside the nacelle and in particular between the various compartments formed by the support structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4b is a partial cross-sectional view along the longitudinal axis of a jack according to the form of FIG. 4a;

FIG. 5b is a partial cross-sectional view along the longitudinal axis of a jack according to the form of FIG. 5a;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
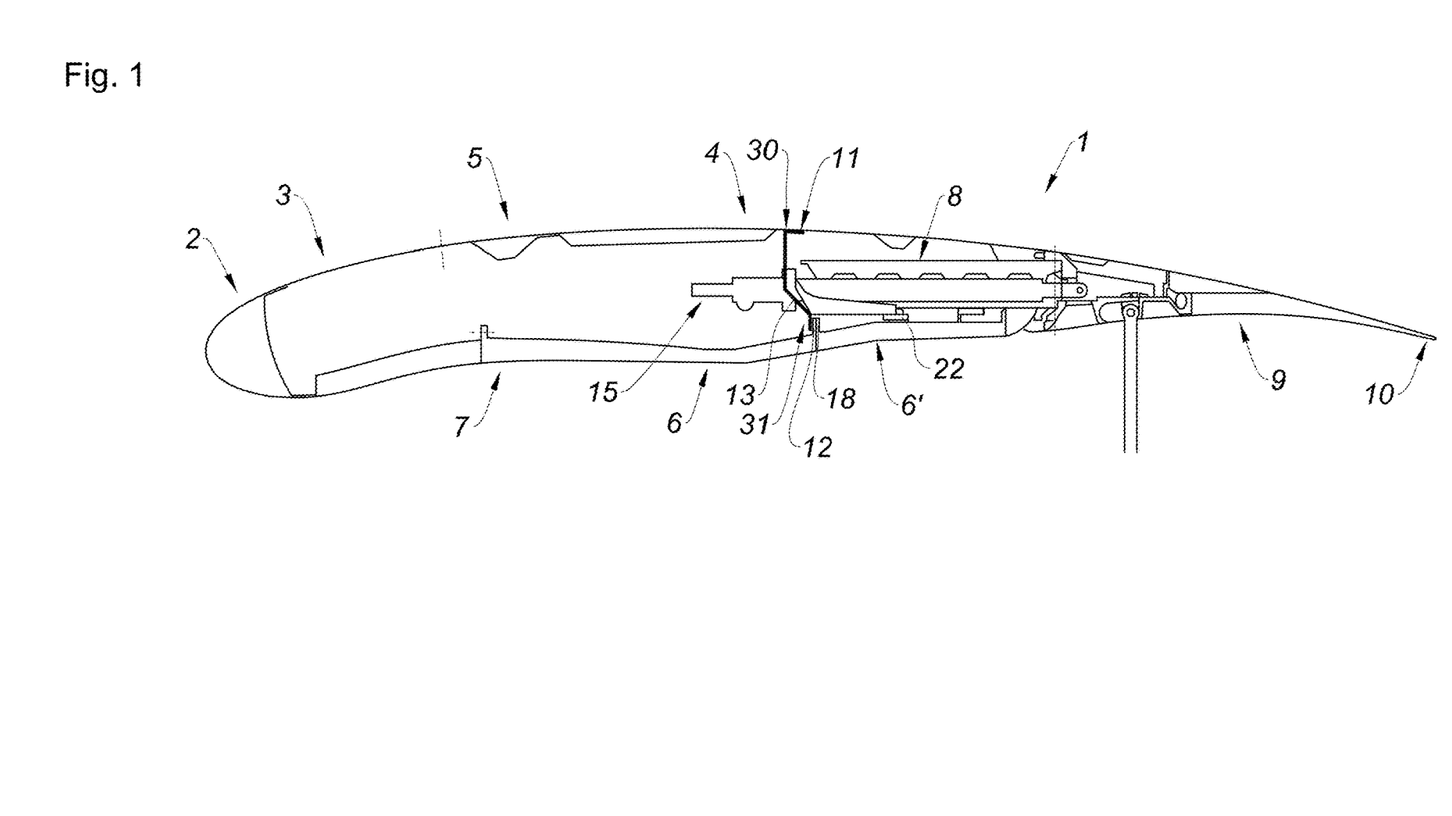
FIG. 1 is a partial cross-sectional view along a longitudinal axis of a propulsion unit according to one form of the present disclosure.

FIG. 1 shows a partial view of an aircraft propulsion unit 1 comprising a nacelle including an air inlet lip 2, an air inlet 3, fan cowls 4 disposed on the external envelope 5 of the nacelle, a turbojet engine comprising a first fan casing 6 and a second fan casing 6' arranged downstream of the first fan casing 6 along a longitudinal axis of the propulsion unit 1, a thrust reverser 8, here with sliding cascades, a primary nozzle 9 and a gas ejection cone 10. The upstream side of the propulsion unit 1 is located at the level of the air inlet lip 2 and the downstream side of the propulsion unit 1 is located at the gas ejection cone 10.

The thrust reverser 8 with sliding cascades is in the retracted position, that is to say in the rest position. The retracted position is the position in which the thrust reverser 8 does not intervene on the flow from the fan. In this position, the thrust reverser 8 is under the external envelope 5, and more precisely housed between the internal and external envelopes 7, 5.

Unlike, when the thrust reverser 8 is in the deployed position, the flow from the fan is reversed and discharged to the outside of the external envelope 5.

A support structure 11 is arranged at a rest zone of the thrust reverser 8, that is to say a zone accommodating the thrust reverser 8 in the rest position. Preferably, this support structure 11 is located at an upstream end of this rest zone. This support structure 11 is configured to connect the fan cowls 4 to the first fan casing 6.

More precisely, a first portion 30 of the support structure 11 is fixed to the fan cowls 4 and a second portion 31 of the support structure 11 is fixed to the fan casing 6.

The support structure 11 is fixed to the first fan casing 6 by means of a flange 12 for a support structure.

The second fan casing 6' also comprises a first flange 18 for an actuator and a second flange 22 for an actuator located downstream of the first flange 18 for an actuator.

In this figure, the support structure 11 has a substantially S shape according to this longitudinal section of the propulsion unit 1, so that the support structure 11 integrates the volume of the thrust reverser 8 while being fixed on the first fan casing 6 and on the fan cowls 4 at the places provided to provide good mechanical strength over time.

Figure 2:
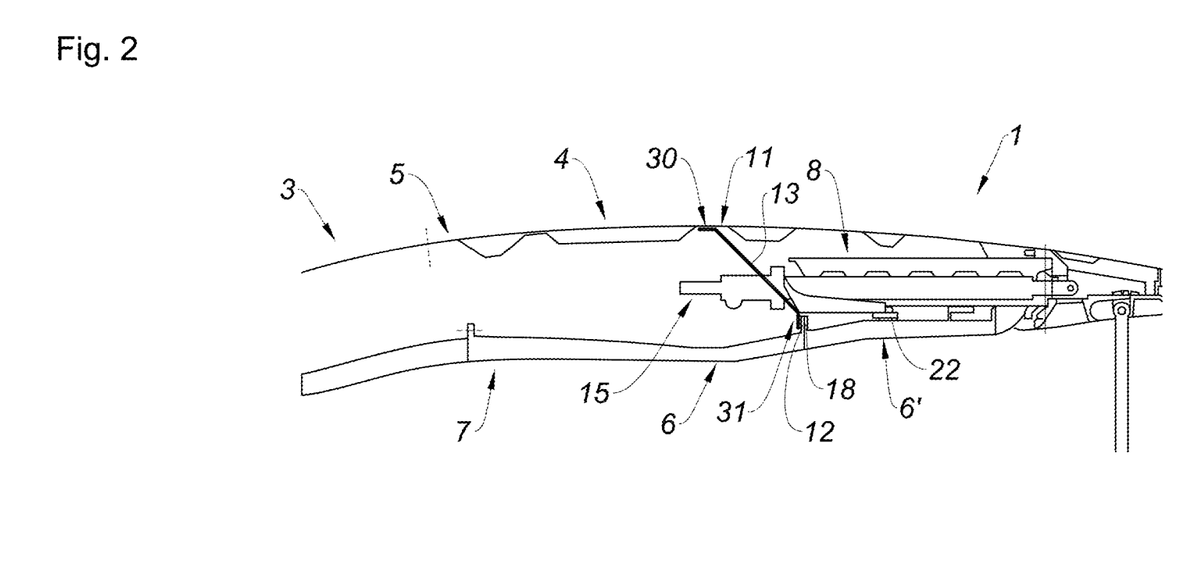
FIG. 2 is a partial cross-sectional view of a propulsion unit according to another form of the present disclosure.
Figure 3:
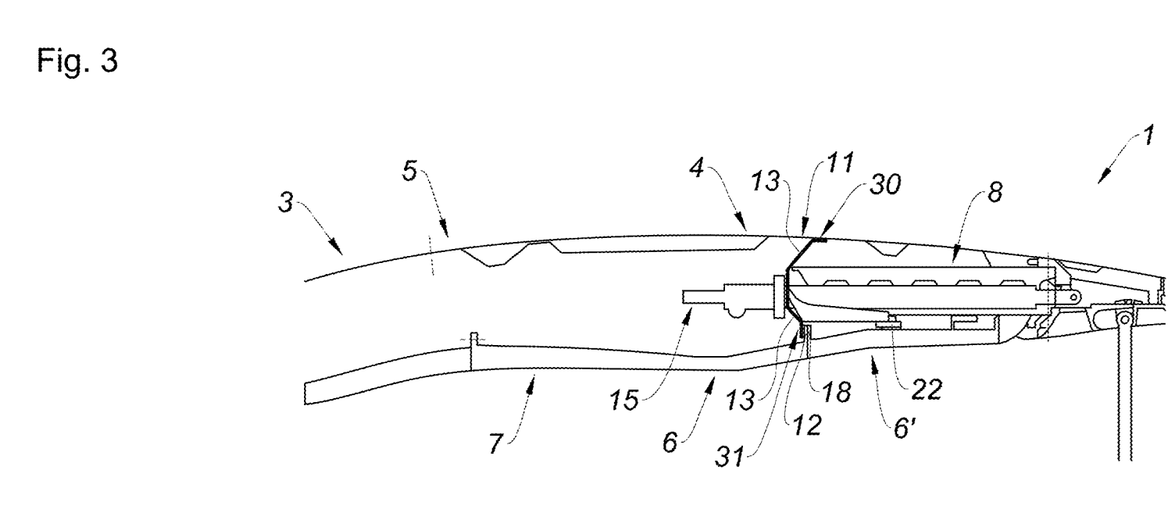
FIG. 3 is a partial cross-sectional view of a propulsion unit according to yet another form of the present disclosure.

The support structure 11, as illustrated in FIGS. 2 and 3, may have a different shape.

Indeed, the support structure 11 is configured to be adapted to the physical constraints of the propulsion unit 1, in particular to the volume of said thrust reverser 8 as well as to the fixing points of said support structure 11 on said fan cowls 4 and said first fan casing 6.

In FIGS. 1, 2 and 3, the flange 12 for the support structure, allowing the fixing of the support structure 11 on the first fan casing 6 is not opposite the position of fixing of the support structure 11 on the fan cowls 4.

The support structure 11 therefore has at least one inclination 13 offering the possibility for the support structure 11 to be fixed on the fan cowls 4 at the desired location, while respecting the volume of the thrust reverser 8.

Indeed, the longitudinal offset of the support structure 11, created by the inclination 13, makes it possible to fix the second portion 31 of the support structure 11 on the fan casing 6 upstream or downstream with respect to the fixing of the first portion 30 of the support structure 11 on the fan cowls 4.

In FIG. 2, the support structure 11 extends along the longitudinal section of the propulsion unit 1.

Figure 4A:
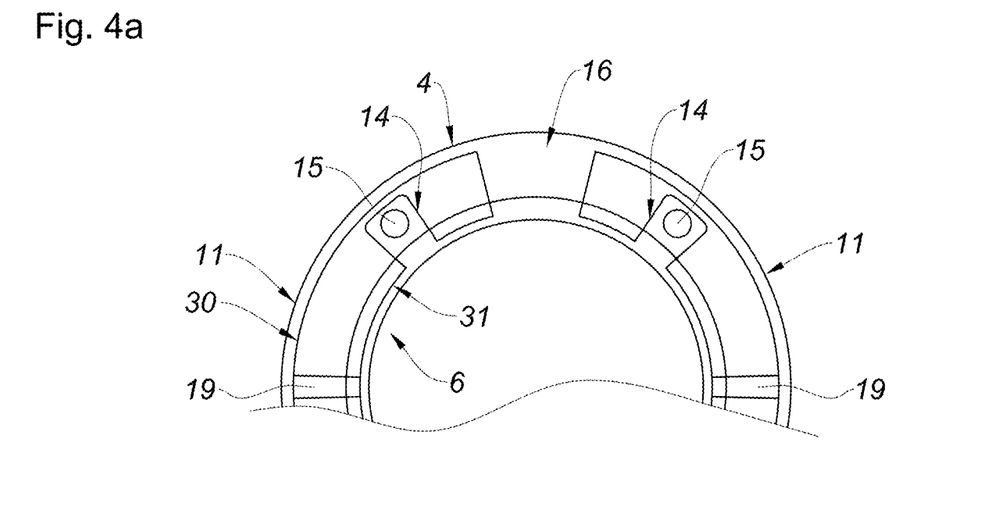
FIG. 4a is a partial cross-sectional view along a longitudinal axis of a support structure according to one form of the present disclosure.

FIG. 4a shows the support structure 11 connecting the fan cowls 4 to the first fan casing 6. The support structure 11 is arranged on the circumference of the first fan casing 6. It is not excluded that the structure 11 is also disposed longitudinally, at least in part, along the longitudinal axis of the second fan casing 6', providing better resistance of the fan cowls 4.

The support structure 11 has apertures 14 configured to receive a corresponding actuator 15, here a jack, of the thrust reverser 8. These apertures 14 can be formed by windows or openings made in the support structure 11.

The support structure 11 includes reinforcements 19 configured to reinforce the support of equipment such as TRAS, EBU and/or FADEC elements. The TRAS elements are control modules. The FADEC elements are full authority electronic control units and The EBUs are elements such as hydraulic units or fuel units. The support structure 11 is here discontinuous as shown in fracture 16. Of course, all the possible discontinuities are possible. It should be noted that the apertures 14 can also be formed by the discontinuity or discontinuities of the support structure 11, arranged opposite the actuator 15.

Figure 4B:
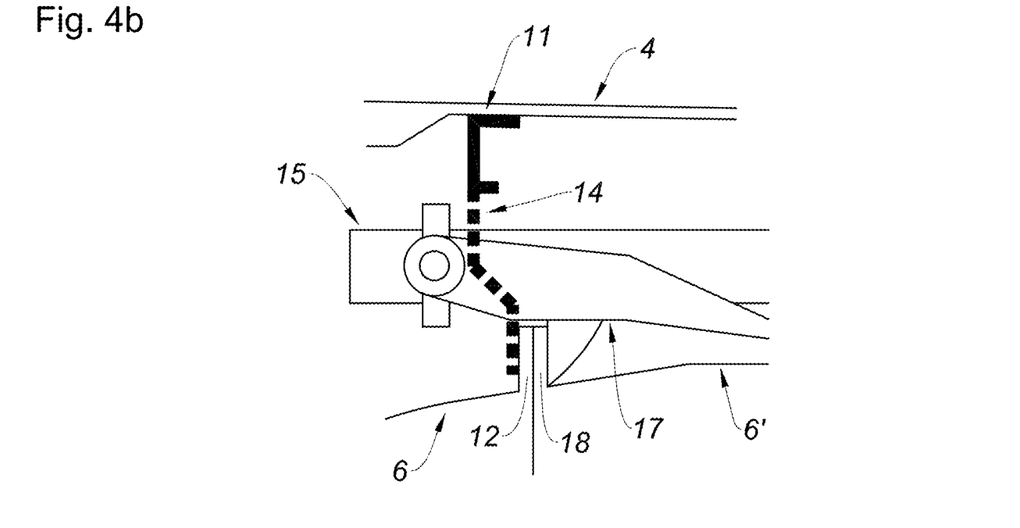

FIG. 4b shows the actuator 15 according to the form shown in FIG. 4a. The actuator 15 is a jack including a fitting 17 which is fixed to the first flange 18 for an actuator, arranged on the second fan casing 6', thus supporting the load of the actuator 15.

The support structure 11 connecting the fan cowls 4 to the first fan casing 6 by the flange 12 for the support structure has an aperture 14. The actuator 15 is configured to pass through this aperture 14 so that the support structure 11 is not in contact with the actuator 15. In other words, a spacing exists on either side of the actuator 15 relative to the support structure 11 forming this aperture 14.

Figure 5A:
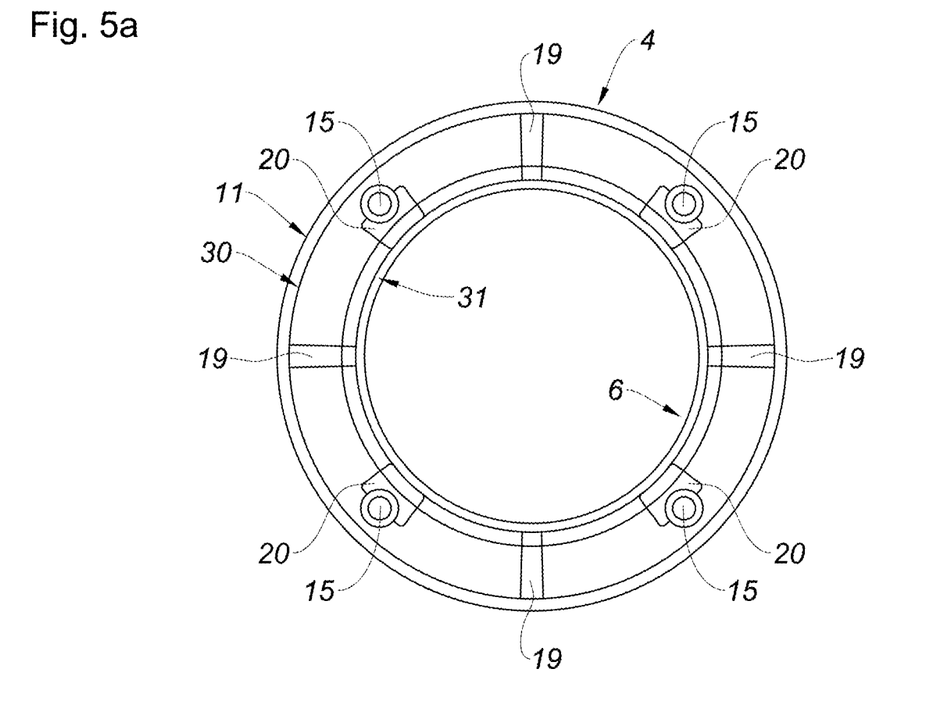
FIG. 5a is a cross-sectional view along a longitudinal axis of a support structure according to another form of the present disclosure.

In another form of the present disclosure, illustrated in FIG. 5a, the four actuators 15 of the thrust reverser 8 are secured to the support structure 11. This fixing of each actuator 15, here jacks, is carried out by means of a universal joint (not represented). The support structure 11 includes the reinforcements 19 as well as additional reinforcements 20 improving the solidarity between each actuator 15 and the support structure 11.

Figure 5B:
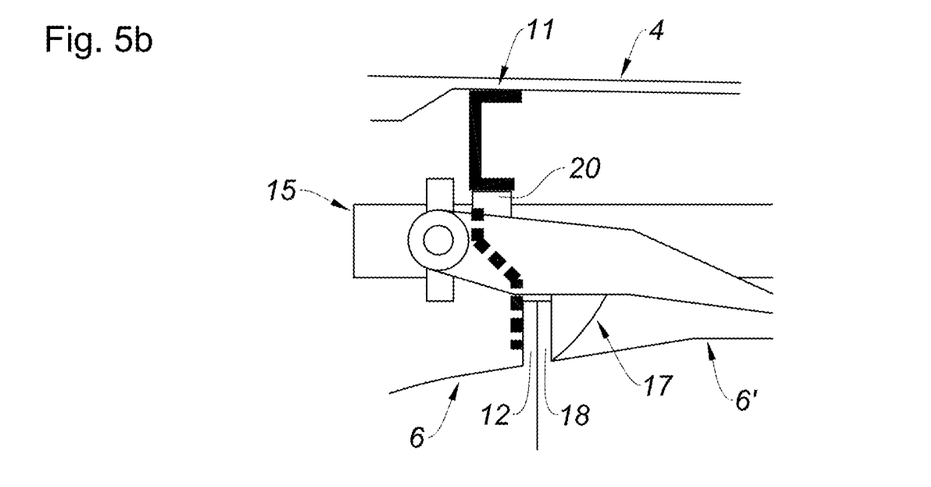

FIG. 5b shows the actuator 15 according to the form shown in FIG. 5a. Unlike the embodiment presented above, the actuator 15 is linked to the support structure 11 by a universal joint (not represented). In addition, additional reinforcements 20 improve the connection between each actuator 15 and the support structure 11. The fitting 17 takes up part of the load from the actuator 15 as also does the second fan casing 6' by its fixing to the fitting 17 on the first flange 18 for the actuator.

The zones of the support structure 11 connected to the actuator 15 are reinforced by additional reinforcements 20 such as stiffeners or greater thicknesses.

Figure 6:
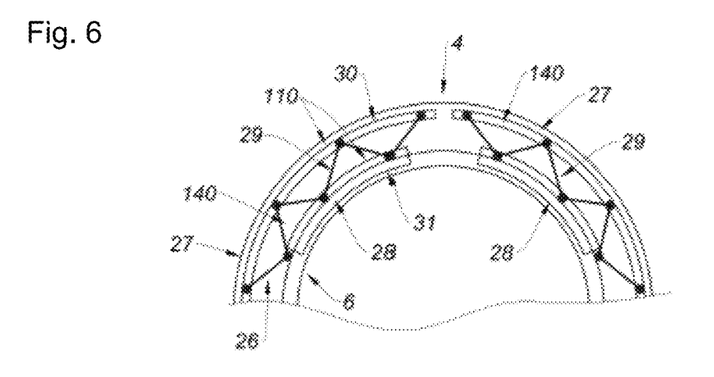
FIG. 6 is a partial cross-sectional view along a longitudinal axis of a support structure according to yet another form of the present disclosure.

FIG. 6 shows a support structure 110 connecting the fan cowls 4 to the first fan casing 6 by means of a lattice structure 26. Unlike the support structure 11 of FIGS. 1 to 5b, the support structure 110 consists of two parts, a first part 27 being fixed to the fan cowls 4 and a second part 28 being fixed to the first fan casing 6. The first part 27 and the second part 28 of the support structure 110 are interconnected by the lattice structure 26, comprising a plurality of arms 29. Apertures 140 delimited by the lattice structure 26 are configured to receive the actuator 15 of the thrust reverser 8. Indeed, the apertures 140 are formed by the arms 29 of the lattice structure 26 and each actuator 15 is configured to fit between the arms 29.

It should be noted that the first and second parts 27, 28 of the support structure 110 can extend continuously over 360° or discontinuously over the circumference of the fan cowls 4 and of the first fan casing 6, respectively.

Of course, the first and second parts 27, 28 of the support structure 110 can be offset with respect to each other along the longitudinal axis. Indeed, the first part 27 opposite the second part 28 of the support structure 110 as illustrated in FIG. 6 is not limiting of the form presented in the present disclosure.

Figure 7:
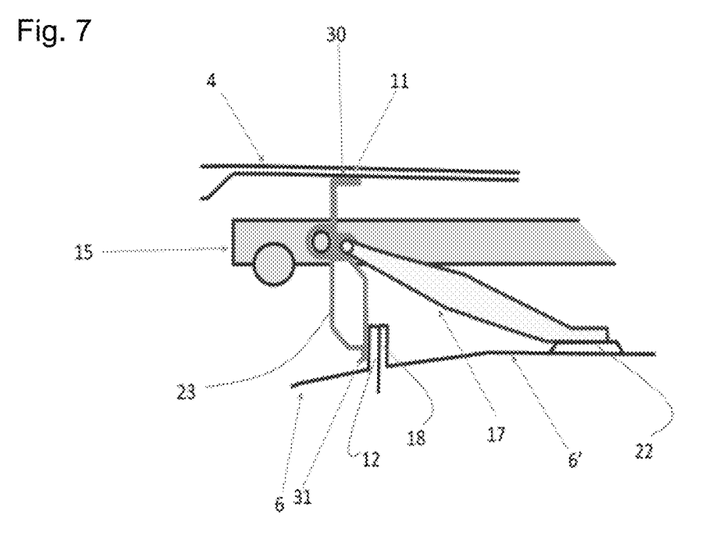
FIG. 7 is a partial cross-sectional view along the longitudinal axis of a jack according to another form of the present disclosure.

Yet according to another form, illustrated in FIG. 7, the actuator 15 is secured to the support structure 11. The fitting 17 is fixed to the second fan casing 6' on the second flange 22 for an actuator according to this form located longitudinally downstream of the flange 12 for the support structure and of the first flange 18 for an actuator according to the form of FIG. 4b, thus taking up the axial loads of the actuator 15. In addition, the support structure 11 comprises a reinforcement, consisting of an additional wall 23.

Figure 8:
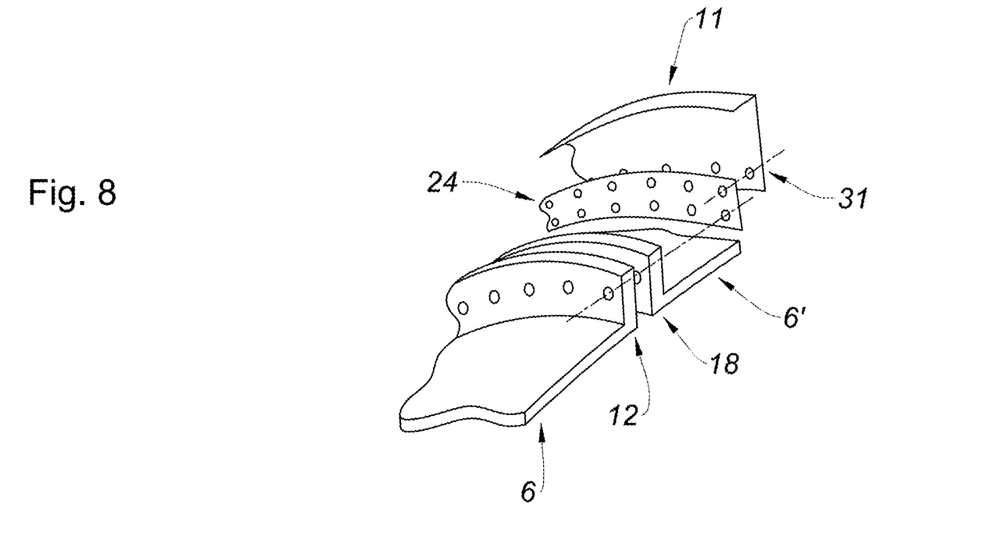
FIG. 8 is a partial perspective view of the fixing of a support structure to a first fan casing according to one form of the present disclosure.

FIG. 8 shows the fixing of the support structure 11 on the first fan casing 6. The fixing is made on the flanges 12 and the flanges 18 for the actuator, by means of a complementary part 24. The support structure 11 is therefore not in direct contact with the flange 12 for the support structure but fixed indirectly by this complementary part 24.

Indeed, the support structure 11 is fixed to the first fan casing 6 by means of the complementary part 24, which is fixed to the flanges 12 and the flanges 18 for the actuator.

The complementary part 24 allows the support structure 11 to be offset without impacting the integrity of the engine.

Of course, the support structure 11 can be fixed directly to the flange 12 without complementary part 24.

In addition, the support structure 11 can be integral with the first fan casing 6, that is to say that the support structure 11 and the first fan casing 6 are formed in one piece.

In a non-represented manner, the support structure 110 according to the form of FIG. 6 is fixed to the first fan casing 6 in the same manner.

Figure 9:
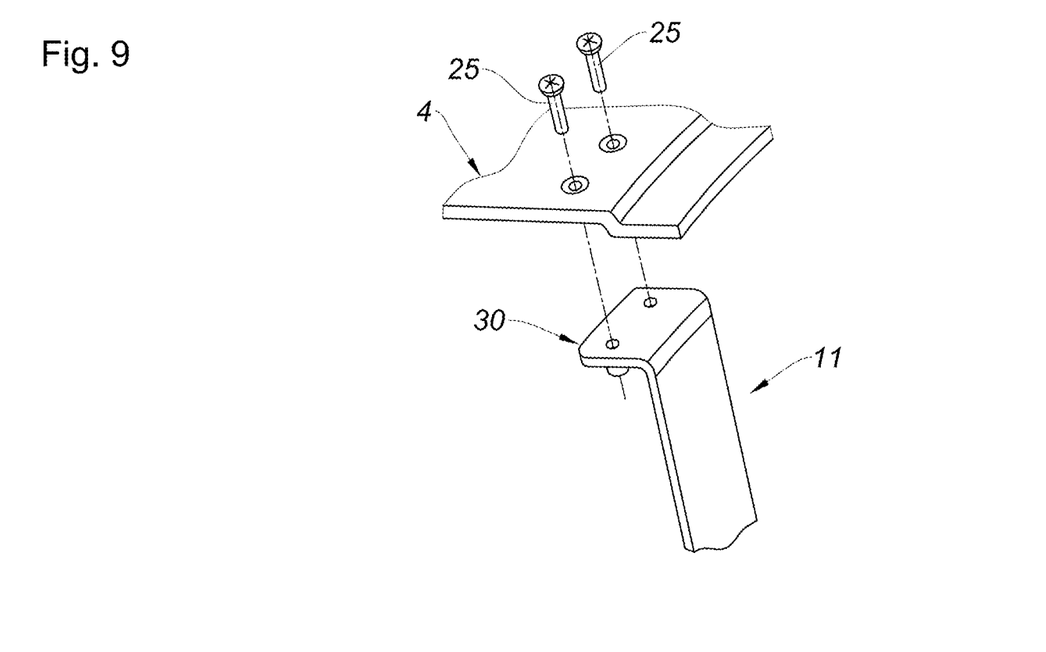
FIG. 9 is a perspective view of the fixing of the support structure to fan cowls according to one form of the present disclosure.

FIG. 9 shows the fixing of the support structure 11 to the fan cowls 4.

The support structure 11 is linked to the fan cowls 4 by removable fasteners or fixing means 25, here two screw-nut assemblies. These removable fixing means 25 can be different, such as rivets.

This connection is made directly on the fan cowls 4.

These removable fixing means 25 provide a transfer of forces according to all the degrees of freedom of the support structure 11 on the fan cowls 4, thus offering a transfer of force between the fan cowls 4 and the first fan casing 6.

In a non-represented manner, the support structure 110 according to the form of FIG. 6 is fixed to the fan cowls 4 in the same way.

Now, the various advantages of these support structures 11 and 110 are presented below.

The support structures 11 and 110 therefore participate in the radial and longitudinal force path between the fan cowls 4 and the first fan casing 6.

These support structures 11 and 110 make it possible to be adapted to the volume of the thrust reverser 8 with sliding cascades, taking into account the actuator(s) 15 configured to displace the thrust reverser 8 from a retracted position to a deployed position, while accommodating the fixing of these support structures 11 and 110 on the first fan casing 6 by means of the flange 12 for the support structure. Indeed, this flange 12 is not always opposite the fixing point of the fan cowls 4.

In addition, these support structures 11 and 110 are airtight and may include one or more orifices providing ventilation of the various compartments separated by these support structures 11 and 110.

These support structures 11 and 110 can also take up part of the load of the actuator(s) 15 of the thrust reverser 8 when the actuators 15 are secured to the support structures 11 and 110.

Finally, these support structures 11 and 110 can support TRAS, FADEC or even EBU elements.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft propulsion unit comprising a nacelle and a turbojet engine, the aircraft propulsion unit comprising:
    an external envelope including fan cowls;
    at least one fan casing cooperating with the fan cowls to define an interior space configured to house cascades of a cascades thrust reverser, the cascades thrust reverser configured to be displaced between a first position and a second position, the at least one fan casing comprises a first fan casing and a second fan casing, the second fan casing being distinct from the first fan casing and disposed downstream of the first fan casing;
    at least one actuator configured to move the thrust reverser between the first position and the second position; and
    at least one support structure extending from the fan cowls to the first fan casing to connect the fan cowls and the first fan casing, the at least one support structure comprises at least one aperture configured to allow passage of part of the at least one actuator, the first fan casing and second fan casing engage each other downstream of where the at least one support structure extends from the fan cowls, and
    wherein the at least one actuator comprises at least one fitting including a first end and a second end, the first end extending from the at least one actuator and the second end configured to be fixed to the second fan casing at a level of at least one first flange,
    wherein the first fan casing supports the fan cowls and the second fan casing supports the at least one actuator, and
    wherein the first end of the at least one fitting is located upstream relative to where the support structure is connected to the first fan casing and upstream relative to the at least one aperture in the support structure, the second end of the at least one fitting is located downstream relative to where the first and second fan casings engage each other.

2. The propulsion unit according to claim 1, wherein the part of the at least one actuator passes through the at least one aperture without being in contact with the support structure.

3. The propulsion unit according to claim 1, wherein the at least one support structure is configured to be fixed to the first fan casing at a level of a second flange, the at least one support structure having a profile comprising at least one inclination, the at least one inclination allowing an offset along a longitudinal axis of the propulsion unit between a first portion and a second radial portion of the at least one support structure.

4. The propulsion unit according to claim 3, wherein the at least one support structure is fixed to the second flange by a complementary part.

5. The propulsion unit according to claim 1, wherein the at least one support structure comprises at least one part disposed longitudinally at a level of the at least one fan casing.

6. The propulsion unit according to claim 1, wherein the at least one support structure is configured to connect the fan cowls and the at least one fan casing around a circumference of the at least one fan casing, the support structure being continuous through 360°.

7. The propulsion unit according to claim 1, wherein the at least one support structure is circumferentially discontinuous.

8. The propulsion unit according to claim 1, wherein the at least one actuator is secured to the at least one support structure.

9. The propulsion unit according to claim 1, wherein the at least one actuator is a jack.

10. The propulsion unit according to claim 1, wherein the support structure comprises a first part being fixed to the fan cowls and a second part being fixed to the at least one fan casing, the first and second parts being connected between them by a lattice structure.

11. The propulsion unit according to claim 1, wherein the at least one support structure is formed integrally with the first fan casing.

12. The propulsion unit according to claim 1, wherein the at least one support structure is removably secured to the fan cowls.

13. The propulsion unit according to claim 1, wherein the at least one support structure is between the first end of the at least one fitting and a location where the first fan casing and second fan casing engage each other.

* * * * *

UNITED STATES PATENT AND TRADEMARK OFFICE
CERTIFICATE OF CORRECTION

| | | |
|---|---|---|
| PATENT NO. | : 12,392,305 B2 | Page 1 of 1 |
| APPLICATION NO. | : 17/536480 | |
| DATED | : August 19, 2025 | |
| INVENTOR(S) | : Patrick Boileau et al. | |

It is certified that error appears in the above-identified patent and that said Letters Patent is hereby corrected as shown below:

On the Title Page

(73) Assignee: Safran Nacelles, GONFREVILLE L'ORCHER (FR)
Should be replaced with:
(73) Assignee: Safran Nacelles, GONFREVILLE L'ORCHER (FR); SAFRAN AIRCRAFT ENGINES, PARIS (FR)

Signed and Sealed this
Eighteenth Day of November, 2025

John A. Squires
*Director of the United States Patent and Trademark Office*